United States Patent [19]

Conradi

[11] 4,142,872

[45] Mar. 6, 1979

[54] METAL BONDED ABRASIVE TOOLS

[76] Inventor: Victor R. Conradi, 12 Totius Ave., Ridgeway, Johannesburg, Transvaal, South Africa

[21] Appl. No.: 867,961

[22] Filed: Jan. 9, 1978

[30] Foreign Application Priority Data

Jan. 26, 1977 [ZA] South Africa ............. 77/0465

[51] Int. Cl.² .................................... B24D 3/06
[52] U.S. Cl. .............................. 51/309; 51/307
[58] Field of Search ................... 51/307, 308, 309

[56] References Cited

U.S. PATENT DOCUMENTS

| 2,476,699 | 7/1949 | Cline | 51/309 |
|---|---|---|---|
| 3,136,615 | 6/1964 | Bovenkerk et al. | 51/309 |
| 3,515,524 | 6/1970 | Grambal | 51/307 |
| 3,819,814 | 6/1974 | Pope | 51/309 |
| 3,868,234 | 2/1975 | Fontanella | 51/309 |
| 3,999,952 | 12/1976 | Kondo et al. | 51/309 |
| 4,000,980 | 1/1977 | Morishita et al. | 51/307 |
| 4,024,675 | 5/1977 | Naidick | 51/296 |

*Primary Examiner*—Donald J. Arnold
*Attorney, Agent, or Firm*—Haseltine, Lake & Waters

[57] ABSTRACT

A metal bonded abrasive body comprising diamond or cubic boron nitride abrasive particles held in a metal bonding matrix, the metal bonding matrix consisting of cobalt, present in an amount of at least 50 percent by weight of the matrix, and boron in the form of cobalt borides substantially uniformly distributed through the matrix. The invention also provides for a method of producing such bodies which includes mixing cobalt or a cobalt alloy, in powder form, with diamond or cubic boron nitride particles and sintering the mixture to produce the body and is characterized in that the cobalt or alloy powder is mixed with a boriding powder and sintered at a temperature of 800° C. to 1000° C. to boride the cobalt, the boriding taking place before or during the body-forming sintering step.

8 Claims, No Drawings

METAL BONDED ABRASIVE TOOLS

This invention relates to metal bonded abrasive tools. Examples of metal bonded abrasive tools are metal bonded grinding wheels, saws, impregnated bits, stope coring bits, and hones. All such metal bonded abrasive tools have a working portion which consists essentially of a plurality of abrasive particles, particularly diamond and cubic boron nitride particles, held in a metal bonding matrix. Suitable metal bonding matrices are iron, nickel, and cobalt and alloys containing these metals.

The working portions of the tools are generally made by mixing the abrasive particles with the matrix in powder form and then sintering the mixture in a mould at a temperature suitable to produce a sintered mass. One of the difficulties in the manufacture of such tools is that it is difficult to produce a bonding matrix of suitable toughness and hardness while maintaining the sintering temperature at a value below that at which the abrasive particle will tend to deteriorate. This problem manifests itself particularly with synthetic diamond which graphitises readily at temperatures higher than 1000° C.

The present invention minimises this problem substantially by providing such tools with a novel bonding matrix.

According to the invention, there is provided a metal bonded abrasive body comprising diamond or cubic boron nitride abrasive particles held in a metal bonding matrix, the metal bonding matrix consisting of cobalt, present in an amount of at least 50 percent by weight of the matrix, and boron in the form of cobalt borides substantially uniformly distributed through the matrix.

The cobalt may be in the form of substantially pure cobalt in which event the metal bonding matrix will consist substantially only of cobalt and boron in the form of cobalt borides. Alternatively, the cobalt may be in the form of a cobalt-containing alloy wherein the cobalt is the major constituent of the alloy.

The metal bonding matrix consists, in effect, of cobalt which has been borided. Boriding is a known process in the art and involves the diffusion of boron into a metal and the formation of one or more metal borides. The invention involves the application of the known boriding process to cobalt or a cobalt-containing alloy thereby producing a matrix for a metal bonded abrasive body which substantially overcomes the problems of the matrices of the prior art as described above. The borided-cobalt matrix of the invention is tough and hard and can be produced at temperatures below 1000° C.

The boron will generally be present in an amount of 0.5 to 3 percent by weight of the bonding matrix.

The abrasive particle content will generally constitute 5 to 15 percent by volume of the body.

In a typical body, the cobalt constitutes 70 to 90 percent by volume of the body, the abrasive particles 5 to 15 percent by volume of the body, with other additives and fillers such as tungsten carbide being optionally provided.

The metal bonded abrasive body may be a saw segment, the rim of a metal bonded grinding wheel, a stope coring bit, an impregnated bit, or like body.

The abrasive particles for the body, as mentioned above, are diamond or cubic boron nitride particles. Because of the tendency for synthetic diamond particles to graphitise at temperatures above 1000° C., the advantages of the invention manifest themselves particularly where the abrasive particle content of the body is predominantly synthetic diamond.

According to another aspect of the invention there is provided a method of making a metal bonded abrasive body as described above, which method includes the steps of mixing cobalt or cobalt alloy, in powdered form, with diamond or cubic boron nitride particles and sintering the mixture to produce the body, and is characterised in that the cobalt or alloy powder is mixed with a boriding powder and sintered at a temperature of 800° C. to 1000° C. to boride the cobalt, the boriding taking place before or during the body-forming sintering step.

It is preferred that the cobalt or alloy powder is borided before it is mixed with the abrasive particles. The reason for this is that gases are generally produced during the boriding process and these gases tend to leave pores in the abrasive body if the boriding takes place simultaneously with the body-forming sintering step.

The boriding powder may be any well known in the art. Boriding powders usually consist of boron carbide ($B_4C$) alone or in combination with other boron-containing substances such as potassium borofluoride. A typical boriding powder is 50 percent potassium borofluoride and 50 percent boron carbide. An example of a commercially available boriding powder is Degussa "G27."

The time of sintering necessary to achieve adequate boriding of the cobalt will vary according to the boriding powder used. The skilled man can readily select a time to achieve a desired result.

An example of the invention will now be described. A segment was made for a stope coring bit in the following manner. Powdered cobalt was mixed with about 4 percent by weight of a commercially available boriding powder Degussa "G27." The mixture was heated to a temperature of about 900° C. and this temperature was maintained for about 60 minutes. The borided powder was then mixed with diamond particles. The diamond particles constituted about ten percent by volume of the mixture. The diamond-containing mixture was placed in a suitable mould and sintered at a temperature of 950° C. A segment was recovered from the mould which was found to have a Rockwell C hardness of 60 to 95. This was very much harder and tougher than a similar segment made in the conventional manner without the boriding step where the Rockwell B hardness was found to be about 90 to 100 (which is about 8 to 10 on the Rockwell C scale). Furthermore, the use of a borided cobalt enabled the sintering to take place at a low temperature of 950° C. To achieve the same bond hardness without the use of a borided cobalt, it is necessary to use other metals which can be sintered only above 1030° C. at which temperatures synthetic diamond tends to graphitise.

I claim:

1. A metal bonded abrasive body comprising diamond or cubic boron nitride abrasive particles, present in an amount of 5 to 15 percent by volume of the body, held in a metal bonding matrix, the metal bonding matrix consisting of cobalt, present in an amount of at least 50 percent by weight of the matrix, and boron in the form of cobalt borides substantially uniformly distributed through the matrix.

2. A body according to claim 1 wherein the metal bonding matrix consists substantially only of cobalt and boron in the form of cobalt borides.

3. A body according to claim 1 wherein the boron is present in an amount of 0.5 to 3 percent by weight of the matrix.

4. A body according to claim 2 wherein the boron is present in an amount of 0.5 to 3 percent by weight of the matrix.

5. A body according to claim 1 wherein the abrasive particles are predominantly synthetic diamond particles.

6. A method of making a metal bonded abrasive body of claim 1 including the steps of mixing cobalt or a cobalt alloy, in powder form, with diamond or cubic boron nitride particles and sintering the mixture to produce the body characterised in that the cobalt or alloy powder is mixed with a boriding powder and sintered at a temperature of 800° C. to 1000° C. to boride the cobalt, the boriding taking place before or during the body-forming sintering step.

7. A method of claim 6 wherein the boriding powder is boron carbide alone or in admixture with another boron-containing compound.

8. A method of claim 6 wherein the cobalt or alloy powder is borided before it is mixed with the abrasive particles.

* * * * *